United States Patent
McBurney

(10) Patent No.: US 7,224,950 B2
(45) Date of Patent: May 29, 2007

(54) ESTIMATING GPS REFERENCE FREQUENCY DRIFT FROM PDC-HANDSET VCO-BURSTS

(75) Inventor: Paul W. McBurney, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 370 days.

(21) Appl. No.: 10/650,383

(22) Filed: Aug. 27, 2003

(65) Prior Publication Data
US 2005/0048941 A1    Mar. 3, 2005

(51) Int. Cl.
*H04B 1/06* (2006.01)

(52) U.S. Cl. .............. 455/258; 455/265; 455/310; 342/357.12

(58) Field of Classification Search ............ 455/556.1, 455/255, 265, 256, 257, 258, 259, 296, 310, 455/311; 342/357.1, 357.12
See application file for complete search history.

(56) References Cited

U.S. PATENT DOCUMENTS

| | | | |
|---|---|---|---|
| 6,064,336 A | 5/2000 | Krasner | |
| 6,122,506 A | 9/2000 | Lau et al. | |
| 6,819,707 B2 * | 11/2004 | Abraham et al. | 375/142 |
| 6,973,121 B1 * | 12/2005 | Eberlein et al. | 375/211 |
| 2001/0028321 A1 * | 10/2001 | Krasner | 342/357.1 |
| 2003/0068977 A1 | 4/2003 | King | |
| 2003/0154025 A1 * | 8/2003 | Fuchs et al. | 701/213 |
| 2004/0142701 A1 * | 7/2004 | Abraham | 455/456.1 |

FOREIGN PATENT DOCUMENTS

EP    1 092 987 A2    4/2001

* cited by examiner

*Primary Examiner*—Edward F. Urban
*Assistant Examiner*—Adeel Haroon
(74) *Attorney, Agent, or Firm*—Mark P. Watson

(57) ABSTRACT

A combination mobile phone and navigation satellite receiver comprises a circuit for correcting GPS receiver reference frequency drift by using VCO burst information periodically received by a PDC handset. A corrected GPS receiver reference frequency drift then enables faster initialization and stable operation of the position solutions made available to users. A GPS numeric controlled oscillator (NCO) receives a PDC handset VCO sample.

9 Claims, 2 Drawing Sheets

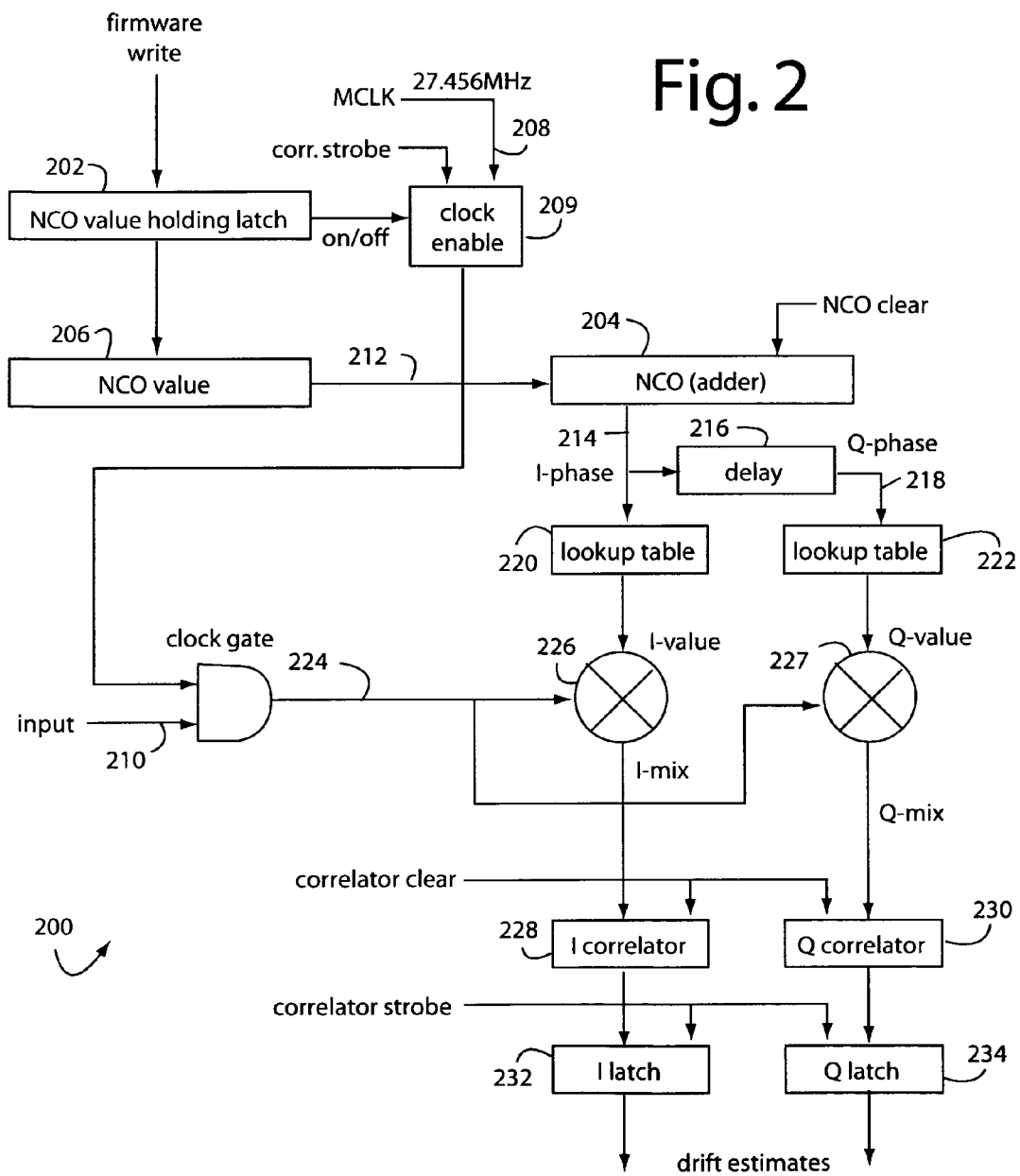

ESTIMATING GPS REFERENCE FREQUENCY DRIFT FROM PDC-HANDSET VCO-BURSTS

FIELD OF THE INVENTION

Figure 1:
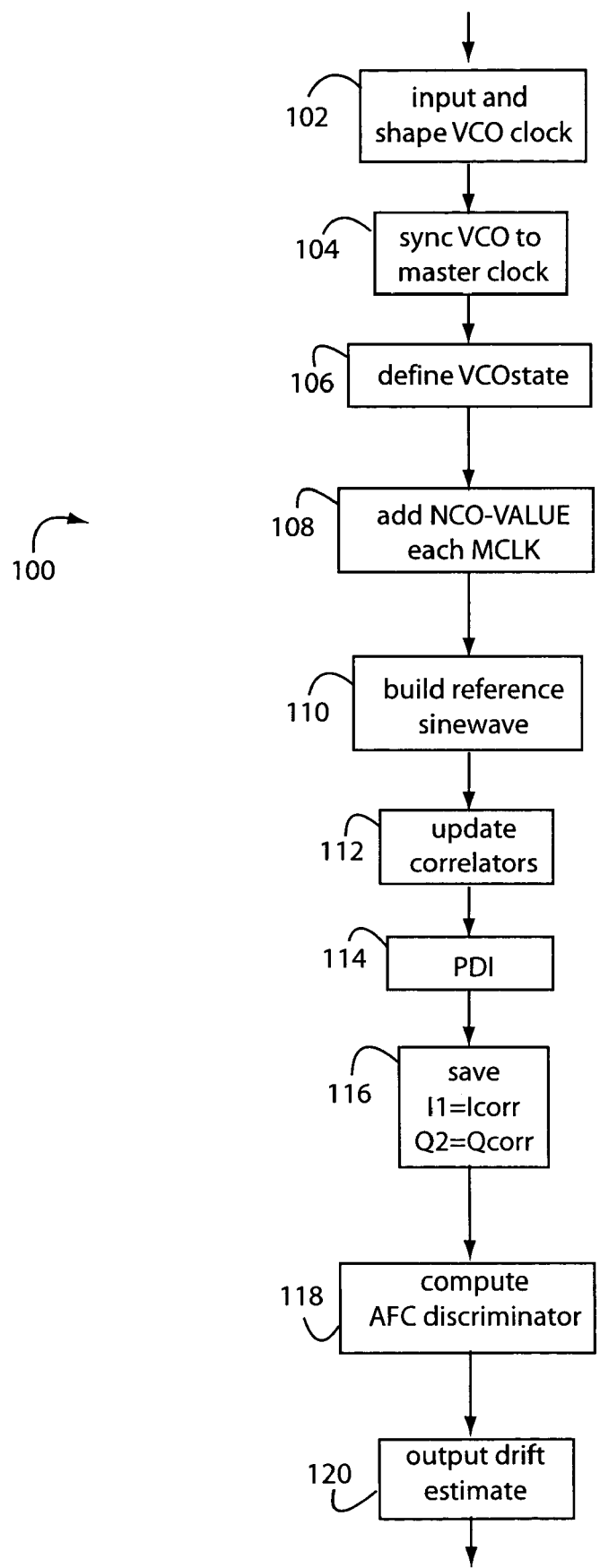

The present invention relates to navigation satellite receivers, and more particularly to methods and systems for operating navigation satellite receivers in conjunction with cellular telephones.

DESCRIPTION OF THE PRIOR ART

Cellular telephones have become ubiquitous, they are everywhere and everyone seems to be using them. Global positioning system (GPS) and other satellite navigation systems are now becoming associated with cellphones so that the position of the user can be determined for both legal and convenience reasons. The United States Government has mandated that cellular providers should report the physical locations of cellphones for emergency 9-1-1 system reasons. But law enforcement also wants to be able to locate criminals who have so-far been able to skirt apprehension by using roaming cellphones. Users and companies have found myriad reasons why it would be good and useful to know the location of theirs and their customer's cellphones. So a marriage of cellular phone and satellite navigation receiver technologies in one mass-marketed handheld device has become critical.

Two things are important in any mass-marketed handheld device, manufacturing cost and battery life. In a hybrid of cellular phone and satellite navigation receiver technologies, it seems appropriate to share tasks and make as many components do double duty as possible. The most obvious is to put the cellphone and satellite navigation receiver in one package and to use one battery to power both. One prior art hybrid device attempts to reduce the number of crystal oscillators needed by slaving the satellite navigation receiver reference frequency input to an output synthesized from the cellphone part.

There are a number of cellphone technologies in use throughout the world. The global system for mobile telecommunications (GSM), e.g., GSM 900, is a mobile phone standard established mainly in Europe, South East Asia, Australia and Africa. North America uses code division multiple access (CDMA) digital wireless technology, e.g., International Standard (IS-95), and several other network technologies which are not compatible with the GSM networks used in Europe. Japan uses CDMA and personal digital communicator (PDC) for its mobile phone networks. GSM phones are incompatible and do not work in Japan.

Typical PDC handsets in standby mode only adjust their voltage-controlled oscillator (VCO) in twenty millisecond bursts every 700 milliseconds. The VCO drift between these bursts is of no consequence to PDC system operation, but such drift exceeds the stringent limits of satellite navigation receiver operation. The periods in which the handset-VCO is actively being locked with a synchronizing burst can provide a good synthesized reference frequency for satellite navigation receiver operation. But the available observation window is not long enough for a frequency counter approach to be used to estimate the satellite navigation receiver drift.

What is needed is a circuit that can borrow timing information from PDC type VCO's in order to help initialize and operate a GPS receiver.

SUMMARY OF THE INVENTION

Briefly, a combination mobile phone and navigation satellite receiver embodiment of the present invention comprises a circuit for correcting GPS receiver reference frequency drift by using VCO burst information periodically received by a PDC handset. A corrected GPS receiver reference frequency drift then enables faster initialization and stable operation of the position solutions made available to users. A GPS numeric controlled oscillator (NCO) receives a PDC handset VCO sample.

An advantage of the present invention is that a system and method are provided for initialization and operation of navigation satellite receivers.

Another advantage of the present invention is that a system and method are provided for reducing the cost of mobile devices with navigation satellite receivers associated and mobile telephones.

These and other objects and advantages of the present invention will no doubt become obvious to those of ordinary skill in the art after having read the following detailed description of the preferred SPS receivers which are illustrated in the various drawing figures.

IN THE DRAWINGS

FIG. 1 is a flowchart diagram of a method embodiment of the present invention; and FIG. 2 is a schematic diagram of a discriminator circuit embodiment of the present invention alternative to the method of FIG. 1.

DETAILED DESCRIPTION OF THE PREFERRED EMBODIMENT

FIG. 1 illustrates a method embodiment of the present invention for estimating GPS reference frequency drift from a phone VCO in standby mode. Such method is referred to herein by the general reference numeral 100. In standby mode, typical PDC handsets adjust their VCO's in 20 msec bursts every 700 msec. An observation window this short is not long enough to estimate the GPS drift using a conventional frequency counter approach. Circuit 100 is able to accurately estimate the GPS drift, assuming the VCO is locked but available only a short time.

In a step 102, a handset VCO clock is input and converted into a square wave with a reasonable duty cycle. The VCO clock is synchronized or gated to a GPS receiver master clock in a step 104. A gated VCO clock variable (VCOstate) is defined in a step 106 as having two states, (1) TTL high, and (−1) TTL low. An NCO with an input clock, MCLK, e.g., 27.456 MHz includes a 24-bit counter that adds an "NCO_VALUE" each MCLK in a step 108. The full master clock is used so VCO frequencies all the way up to MCLK can be accommodated. Input commands are preferably used to define the nominal VCO frequency. Thus, NCO_VALUE=VCO*$2^{24}$/MCLK. A 4-bit variable, Istate, is equal to the top 4-bits of the NCO. A second 4-bit variable, Qstate=Istate+4, is defined. Each MCLK, a reference sine and cosine function are built in a step 110 using a sinusoidal table, where Istate and Qstate are the inputs to the table. For example,

TABLE I table [0] = 1;
table [1] = 3;
table [2] = 4;
table [3] = 5;
table [4] = 5;
table [5] = 4;
table [6] = 3;
table [7] = 1;
table [8] = −1;
table [9] = −3;
table [10] = −4;
table [11] = −5;
table [12] = −5;
table [13] = −4;
table [14] = −3;
table [15] = −1.

In a step 112, each MCLK, two correlators are updated according to a carrier mix, Icorr+=VCOstate*table[Istate], and Qcorr+=VCOstate*table[Qstate]. A signed 18-bit correlator is adequate for a one-msec integration at 27.456 MHz. Another variable, for the pre-detection interval, "PDI" is defined. For a step 114, the length of the PDI variable is a function of GPS drift being solved. The PDI is selected such that it will not be aliased in the observation time. DRIFT_ERROR<2/MIX_PDI, where DRIFT_ERROR is in Hz at NCO_NOMINAL, e.g., if the drift error is 10 PPM, the error at nominal is 274.56 Hz. Thus, for a 1 msec PDI, the drift is within the detectable range of 500 Hz.

If the PDI is too long, the frequency will be aliased. This might still be acceptable is there is an SCXO model to enable detection of aliasing. A preferred approach defines the PDI to be long enough to reduce noise, but also short enough to prevent aliasing of the worst GPS drift offset. For example, a 25 PPM drift error=686.4 Hz. A PDI of 0.5 msec has an alias at 1 kHz, so the drift value could be properly computed.

At the end of a first PDI, the I1=Icorr and Q2=Qcorr are saved in a step 116. During a second PDI, I2=Icorr and Q2=Qcorr are saved. The standard AFC discriminator is computed in a step 118, Cross=I1*Q2−I2*Q1, and Dot=I1*I2+Q1*Q2. Forming the ratio X=Cross/Dot. From trigonometry, $$X = \tan[(\omega_{vcoError} - \omega_{gpsError}^{VCO}) * PDI].$$

Where $\omega_{vcoError}$=radian frequency error of the VCO from nominal, and equals True VCO frequency−VCO_NOMINAL, where $\omega_{gpsError}^{VCO}$=radian frequency error of the GPS crystal from nominal expressed at the VCO nominal frequency.

Thus, $$\omega_{gpsError} = \omega_{gpsError}^{VCO} * MCLK / VCO$$
$$= (\text{True } GPS \text{ frequency} - MCLK)$$
$$= \text{drift(at } MCLK)$$

So, $$\omega_{gpsError}^{VCO} = 2 * PI * \text{drift} * VCO / MCLK$$

Assuming that $\omega_{vcoError}$=0, the GPS frequency error is $$(0 - \omega_{gpsError}^{VCO}) * PDI = \tan^{-1}(X).$$

An estimate of the GPS reference drift is thus available in a step 120. The accuracy of the calculation can be improved by recognizing the PDI is formed by counting MCLKs. It is affected by the drift being solved for. This can be accounted for by modeling the fact that the real PDI equals NUM_CLKS*period of MCLK, and equals NUM_CLKS/(MCLK+drift(at MCLK)). NUM_CLKS is expressed as the number of MSEC, NUM_CLKS=MSEC*0.001*MCLK.

Making two substitutions,(0−2*PI*drift*VCO/MCLK)*MSEC*0.001*MCLK/(MCLK+drift)=tan$^{-1}$(X). Solving for drift, Drift(at MCLK)=tan$^{-1}$(X)*MCLK/(2*PI*0.001*MSEC*VCO+tan$^{-1}$(X))

Using a 13 PPM GPS error, the true frequency is 27,456,356.93 Hz. Thus, drift true=356.93 Hz. In 1000 experimental runs using a MSEC=1, the average frequency was 355.97 Hz, with an error of 0.96 Hz. Such led to an average PPM error=0.035 PPM, and a standard deviation of 0.026 PPM.

For frequency assistance while the phone is in standby mode, the circuit 100 preferably executes in background before a GPS fix is needed. When a GPS fix is requested, a "hot" drift estimate is available and there will be no delay GPS time-to-first-fix (TTFF) waiting for frequency assist.

During each 20 msec standby period, consecutive 1-MSEC estimates are preferably collected and averaged to further reduce the error.

FIG. 2 illustrates a second embodiment of the present invention, a discriminator 200 is used to measure frequency differences between the GPS clock and an external VCO clock. A conventional freqDiff circuit provides good precision if the observation interval is long with respect to the external clock frequency. In applications where the external clock is only observable for short periods, a different type of circuit is needed. The freqDiff2 circuit is a simple quadrature detector, in which sequential observations provide frequency error detection.

In circuit 200, a numeric controlled oscillator (NCO) latch 202 receives any writes from a firmware control program for an NCO 204. An NCO value 206 is written periodically as VCO information is obtained, e.g., from a PDC handset in standby mode.

The NCO 204 is used to generate an external clock's nominal frequency. For example, to determine the difference in frequency between a master clock (MCLK) 208 and an external clock input 210, the nominal frequency is generated with the NCO to form a quadrature error signal.

The NCO 204 is preferably a 24-bit unsigned adder that adds a variable NCO_VALUE 212 each master clock. For each MCLK of the 27.456 MHz clock 208, the NCO 204 adds the NCO_VALUE 212 to the previous value. A frequency signal 214 produced by the NCO 204 is a function of the NCO_VALUE. The circuit converts the MCLK to the desired frequency. NCO_VALUE (bits)=desired frequency (Hz)*2$^{24}$ (bits)/MCLK (Hz). The top 4-bits of the NCO are used in a digital delay 216 to produce a 16-bit phase sine variable, Istate, where Istate=NCO>>20. A quadrature version (cosine) 218 is created by digital delay 216 to advance the Istate by four states (90-degrees). Qstate=(Istate+4) & 0xF. The Istate and Qstate are both input to respective 16-state lookup tables 220 and 222, e.g.,

TABLE II

| Table Input | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Table output | 1 | 3 | 4 | 5 | 5 | 4 | 3 | 1 | −1 | −3 | −4 | −5 | −5 | −4 | −3 | −1 |

The external clock is gated by a gate 224 with MCLK and for a variable, Input, which has logical value of (0,1). If the external clock is a logical (TTL) high state (1), then it gets a numerical value of "1". Otherwise, it has the low state (0) and gets the value "−1".

TABLE III

```
Each MCLK:
  If (input = 1)
    Icorr   += table(Istate)
    Qcorr   += table(Qstate)
  Else
    Icorr   −= table(Istate)
    Qcorr   −= table(Qstate)
```

An I-mixer 226 and a Q-mixer 227 respectively feed an I-correlator 228 and a Q-correlator 230. When the circuit 200 is enabled, such correlators are cleared. Counting begins at a next millisecond interrupt. An interrupt may be produced at each millisecond. The first values will be zero and are preferably discarded by the firmware. Every millisecond, the Icorr and Qcorr values are latched into respective holding registers 232 and 234. The correlators are cleared and the integration continues until the circuit is halted.

An observation period of a half millisecond may be useful for estimating larger frequency differences. The maximum theoretical value for each correlator in one millisecond is, $27456 \ast 5 = 137280$. Since, $2^{17} = 131072$, and $2^{18} = 262144$, the registers Icorr and Qcorr can each be 18-bit signed registers. The results are sign-extended into a 24-bit word. A freqDiff2 interrupt bit is used to report when the circuit is enabled and has a new result.

The circuit 200 is controlled by writing an NCO_VALUE. The copying of a word into the circuit happens when the most significant byte is written. An bit set in NCO_VALUE indicates the circuit is enabled. All zeros indicates the circuit is disabled.

For a read operation, (1) the clock enable set off, all three bytes of input NCO_VALUE are set to zero, and the NCO and correlators are cleared; (2) the clock enable is set on if any bit of NCO_VALUE is set, and upper byte written, clock enabled after a next correlator strobe; (3) NCO is run at MCLK; (4) the clock gate gates the input clock with the master clock; (5) Iphase is a 4-bit word, and Qphase is a 4-bit word advanced from I by 4; (6) the Ivalue and Qvalue results from table lookup; (7) Imix and Qmix are products of input (+/−1) times table output; (8) the correlators are 24-bit adders, e.g., 4-bit pre-adder, 20-bit up/down counter; (9) a correlator strobe is set as a millisecond interrupt; (10) the latches are readable from the host as the drift estimate; (11) a bit is set in int2 status when one msec integration is complete, e.g., to avoid setting interrupt at when circuit is enabled by detecting both I and Q latch are zero.

Although the present invention has been described in terms of the presently preferred SPS receivers, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method for estimating reference frequency drift in an uninitialized navigation receiver from a local oscillator in a cellular telephone handset operating in standby mode, the method comprising the steps of:

associating a cellular telephone handset subject to standby mode operation in which a base station provides 20-msec bursts of frequency reference information about every 700-msec, with a navigation receiver requiring initialization;

during said standby mode operation, sampling said 20-msec bursts of frequency reference information from a base-station;

running a numeric controlled oscillator (NCO) at a nominal frequency;

periodically adjusting said NCO with samples obtained in the step of sampling such that said base station provides a basis for accurate frequency measurement through a series of updates that coincide with said 20-msec bursts of frequency reference information;

correlating both in-phase and quadrature-phase outputs of said NCO;

computing a navigation receiver reference frequency drift estimate from information derived in the step of correlating; and using said drift estimate to improve initialization performance in said navigation receiver by reducing local oscillator frequency uncertainty.

2. The method of claim 1, further comprising the step of:

building a reference sinewave from data output by said NCO and passing such as updates to the step of correlating.

3. A circuit for estimating reference frequency drift in a navigation receiver, comprising:

a numeric controlled oscillator (NCO) for periodically receiving an NCO_value on which an NCO output frequency depends;

a first lookup table for approximating a sinewave from an inphase version of said NCO output frequency;

a first mixer connected to an output of the first lookup table and for combining it with a gated master clock (MCLK) signal, and providing further for an I-mix signal output;

an I-correlator for correlating said I-mix signal output and having an I-correlation output;

a second lookup table for approximating a cosine wave from a quadrature phase version of said NCO output frequency;

a second mixer connected to an output of the second lookup table and for combining it with said gated master clock (MCLK) signal, and providing further for a Q-mix signal output;

means for sampling the signal of a VCO synchronized by an MCLK signal in those intervals of time when the VCO is instantaneously being locked to a precision carrier frequency signal from a wireless communications network;

a Q-correlator for correlating said Q-mix signal output and having an Q-correlation output; and a drift estimate output comprising said I-correlation and Q-correlation outputs; and a local oscillator frequency-uncertainty reducing circuit that operates before said navigation receiver is initialized, and when a mobile telephone is operating in a standby mode, and for speeding up initialization by using a drift estimate represented at said I-correlation and Q-correlation outputs.

4. The circuit of claim 3, further comprising:

an NCO value holding latch for receiving data from a firmware control program, and connected to gate said MCLK signal to the first and second mixers.

5. The circuit of claim 3, further comprising:

an I-latch and a Q-latch providing for a register of said I-correlation and Q-correlation outputs accessible by a firmware control program.

6. A frequency discriminator circuit for estimating the reference frequency drift in an uninitialized navigation receiver which is associated with a mobile telephone in standby mode that periodically locks to a precision carrier frequency broadcast signal of a wireless communications network, and comprising a master clock (MCLK) (208) that provides a local reference frequency to the navigation receiver, and a voltage controlled oscillator (VCO) signal (210) that is periodically corrected in standby-mode by said precision carrier frequency broadcast signal:

characterized by operating of the following when said mobile telephone is operating in standby mode, a numeric controlled oscillator (NCO) (204) clocked by the MCLK (208) and loaded with an NCO value (206) to synthesize the frequency of the VCO signal (210);

a clock gate to sample the VCO signal (210) during those intervals of time when it is actively being locked to a precision carrier frequency signal broadcast by the wireless communications network;

a set of sine and cosine waveform generators (216, 218, 220) driven by the data output by said NCO (204) to form an in-phase (I-value) and a quadrature-phase (Q-value) signal;

an in-phase and quadrature-phase mixer (226, 227) to mix both the I-value and Q-value signals with an MCLK-gated signal (224) for an I-mix output and a Q-mix output;

an in-phase and quadrature-phase integrator (228, 230) to integrate said I-mix and Q-mix output;

an in-phase and quadrature-phase latch (232, 234) to store a reference frequency drift estimate from the integrators; and a circuit to use said reference frequency estimate to reduce frequency uncertainty before a navigation receiver is initialized.

7. A method for estimating reference frequency drift in a navigation receiver, comprising the steps of:

during standby operation of an associated mobile telephone handset, and before a navigation receiver is initialized and tracking a GPS satellite:

inputting (102) the signal of a voltage controlled oscillator (VCO) that can be locked to the precision carrier frequency signal of a wireless communications network that occurs in bursts during standby mode and that are sensed by said associated mobile telephone handset;

characterized by, sampling (104, 106) the signal of a VCO in those intervals of time when the VCO is locked to the precision carrier frequency signal of a wireless communications network;

running (108) a numeric controlled oscillator (NCO) at a nominal frequency;

building (110) sine and cosine waves from data output by said NCO to form an in-phase and a quadrature-phase signal;

mixing both the in-phase and quadrature-phase signals with the sampled VCO signal;

integrating (112, 114) both the mixed in-phase and the mixed quadrature-phase signals over a pre-detection interval of time;

computing (118) a navigation receiver reference drift estimate from information derived in consecutive steps of integrating; and adjusting the nominal frequency of said NCO with results obtained in the step of computing.

8. The method of claim 7, wherein the pre-detection interval is shorter than half the period of the largest deviation from the reference frequency that is to be detected.

9. The method of claim 7, wherein consecutive estimates are collected and averaged to further reduce the error.

* * * * *

UNITED STATES PATENT AND TRADEMARK OFFICE
CERTIFICATE OF CORRECTION

| | |
|---|---|
| PATENT NO. | : 7,224,950 B2 |
| APPLICATION NO. | : 10/650383 |
| DATED | : May 29, 2007 |
| INVENTOR(S) | : Paul W. McBurney |

Page 1 of 1

It is certified that error appears in the above-identified patent and that said Letters Patent is hereby corrected as shown below:

<u>Column 7,</u>

Line 7, please change "output; and" to --output;--

Signed and Sealed this

Third Day of June, 2008

JON W. DUDAS
*Director of the United States Patent and Trademark Office*